United States Patent
Payne et al.

(10) Patent No.: US 11,149,830 B2
(45) Date of Patent: Oct. 19, 2021

(54) HYBRID MODULE CONFIGURATION

(71) Applicant: Schaeffler Technologies AG & Co. KG, Herzogenaurach (DE)

(72) Inventors: Matthew Payne, Glenmont, OH (US); Patrick Lindemann, Wooster, OH (US); Markus Steinberger, Sagamore Hills, OH (US); Micah Steiner, Smithville, OH (US); Daniel Sayre, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 202 days.

(21) Appl. No.: 16/527,663

(22) Filed: Jul. 31, 2019

(65) Prior Publication Data

US 2020/0040974 A1  Feb. 6, 2020

Related U.S. Application Data (60) Provisional application No. 62/713,584, filed on Aug. 2, 2018.

(51) Int. Cl.
*F16H 45/00* (2006.01)
*F16H 41/24* (2006.01)
(Continued)

(52) U.S. Cl.
CPC .............. *F16H 45/00* (2013.01); *B60K 6/40* (2013.01); *B60K 6/48* (2013.01); *F16H 41/24* (2013.01);
(Continued)

(58) Field of Classification Search
CPC . B60K 6/26; B60K 6/36; B60K 6/387; B60K 6/40; B60K 6/48; B60K 2006/4825;
(Continued)

(56) References Cited

U.S. PATENT DOCUMENTS 6,585,066 B1 * 7/2003 Koneda ................ B60K 6/48
180/65.25
2004/0041402 A1  3/2004 Dehrmann
(Continued)

FOREIGN PATENT DOCUMENTS

EP  1318925 B1  6/2004
KR  100789188 B1  2/2008

OTHER PUBLICATIONS

Payne et al., U.S. Appl. No. 16/029,992, filed Jul. 9, 2019.

*Primary Examiner* — Richard M Lorence
(74) *Attorney, Agent, or Firm* — Kevin L. Parks (57) ABSTRACT

A torque converter for a hybrid module may include a hydraulic coupling arrangement, a front cover, an impeller shell, and an electric rotor. The hydraulic coupling arrangement may include an impeller and a turbine. The front cover may have a first rim extending in a first axial direction. The front cover may at least partially encase the hydraulic coupling arrangement. The impeller shell may be fixed to the front cover and may at least partially encase the hydraulic coupling arrangement. The impeller shell may have a second rim extending in a second axial direction, opposite the first axial direction, a circumferential ring at a distal end of the second rim, and at least one impeller blade. The electric rotor may be fixed to the impeller shell second rim and axially retained by the circumferential ring.

19 Claims, 4 Drawing Sheets

(51) Int. Cl.
  *B60K 6/40* (2007.10)
  *B60K 6/48* (2007.10)
  *F16H 45/02* (2006.01)

(52) U.S. Cl.
  CPC ....... *F16H 45/02* (2013.01); *F16H 2041/246* (2013.01)

(58) Field of Classification Search
  CPC ..... B60K 6/54; F16H 45/00; F16H 2045/002; F16H 45/02; F02F 11/007
  See application file for complete search history.

(56) References Cited

U.S. PATENT DOCUMENTS

| | | | |
|---|---|---|---|
| 2008/0023287 A1* | 1/2008 | Thiede | B60K 6/40 192/48.1 |
| 2012/0175212 A1 | 7/2012 | Hart et al. | |
| 2015/0000262 A1* | 1/2015 | Iwase | B60K 6/405 60/330 |
| 2016/0105060 A1 | 4/2016 | Lindemann et al. | |
| 2017/0328457 A1 | 11/2017 | Vanni et al. | |

\* cited by examiner

HYBRID MODULE CONFIGURATION

CROSS-REFERENCE TO RELATED APPLICATIONS

This application claims the benefit of U.S. Provisional Patent Application No. 62/713,584, filed Aug. 2, 2018, the disclosure of which is incorporated in its entirety by reference herein.

TECHNICAL FIELD

The present disclosure relates generally to a hybrid module, and more specifically to a torque converter and electric motor configuration in a hybrid module.

BACKGROUND

Hybrid modules are known. One example is shown in commonly-assigned co-pending U.S. patent application Ser. No. 16/029,992 titled OIL DISTRIBUTION IN A HYBRID MODULE TO USE CLUTCH COOLING TO COOL E-MOTOR ROTOR AND STATOR filed Jul. 9, 2018.

SUMMARY

According to one embodiment, a torque converter for a hybrid module may include a hydraulic coupling arrangement, a front cover, an impeller shell, and an electric rotor. The hydraulic coupling arrangement may include an impeller and a turbine. The front cover may have a first rim extending in a first axial direction. The front cover may at least partially encase the hydraulic coupling arrangement. The impeller shell may be fixed to the front cover and may at least partially encase the hydraulic coupling arrangement. The impeller shell may have a second rim extending in a second axial direction, opposite the first axial direction, a circumferential ring at a distal end of the second rim, and at least one impeller blade. The electric rotor may be fixed to the impeller shell second rim and axially retained by the circumferential ring.

The second rim may include an axially extending radial protrusion for circumferentially retaining the electric rotor. The second rim may be disposed radially outside of the first rim and extends axially beyond the first rim in the second axial direction. The torque converter may include a drive plate fixed to the front cover and arranged for driving engagement with a coil spring. The second rim may be at least partially disposed radially outside of the drive plate. The torque converter may include a drive plate, a piston plate, a leaf spring, and a rivet. The drive plate may be fixed to the front cover and arranged for driving engagement with a coil spring. The piston plate may be axially displaceable and rotationally fixed to the front cover. The leaf spring may connect the piston plate to the front cover. The rivet may extend through respective apertures in the drive plate, the front cover, and the leaf spring to fix the drive plate, the front cover, and the leaf spring together.

The torque converter may include a piston plate, a leaf spring, and a seal. The piston plate may be axially displaceable and rotationally fixed to the front cover. The leaf spring may connect the piston plate to the front cover. The seal may be disposed in a radially outer notch of the piston plate. The leaf spring may include a plurality of leaf springs integrally formed as a single component with a radially outer ring for axially retaining the seal in the notch. The torque converter may have a friction plate including a friction material ring with a groove. The piston plate and the leaf spring may have respective aligned apertures radially aligned with the groove. The torque converter may include a clutch plate with a radial tab. The front cover may have a tab extending axially in the first direction from a distal end of the first rim and in driving engagement with the radial tab. The torque converter may have a snap ring, the tab may have a groove, and the snap ring is disposed in the groove to axially retain the clutch plate.

The torque converter may have a resolver rotor fixed to the impeller shell. The resolver rotor may at least be partially axially aligned with the impeller blade. The hydraulic coupling arrangement may have a hydraulic stator and a one-way clutch. The hydraulic coupling arrangement may be a fluid coupling devoid of a stator. The torque converter may have a cover hub and a bearing arranged on the cover hub for installation between the cover hub and an engine crankshaft. The torque converter may have a resilient element disposed axially between the front cover and the bearing.

According to another embodiment, a torque converter drive arrangement may include a front cover for a torque converter, a drive plate fixed to the front cover, a spring retainer, and a coil spring. The spring retainer may be arranged for fixing directly to an engine crankshaft. The coil spring may be in driving engagement with the drive plate and the spring retainer. The torque converter drive arrangement may include a combined radial and axial bearing. The front cover may have an integral cover hub formed from a same piece of material and the combined radial and axial bearing may be installed on the cover hub and arranged to interface with the engine crankshaft. The torque converter drive arrangement may have a diaphragm spring installed axially between the front cover and the combined radial and axial bearing.

According to another embodiment, a clutched drive arrangement for a torque converter may include a hub, a front cover, a clutch, and a radial pipe. The hub may be arranged for fixing directly to an engine crankshaft. The clutch may be arranged for releasably connecting the hub to the front cover. The radial pipe may be sealingly engaged with the hub to provide an operating oil to the clutch for rotationally connecting the engine and the front cover. The radial pipe may be installed in a ring arranged for fixing to an engine block and the hub may have a pair of circumferential seals for sealing the hub to the ring. The clutch may have an apply chamber. The hub may have a flow path fluidically connecting the radial pipe and the apply chamber. The clutched drive arrangement may have a clutch piston plate and a leaf spring. The apply chamber may be at least partially formed by the hub and the clutch piston plate. The leaf spring may rotationally fix the clutch piston plate to the hub.

The clutched drive arrangement may have a backing plate fixed to the hub and a clutch plate. The clutch piston plate may be installed between the hub and the clutch plate. The clutch plate may be installed between the clutch piston plate and the backing plate. The clutched drive arrangement may include a spring retainer fixed to the clutch plate, a drive plate fixed to the front cover, and a spring drivingly engaged with the spring retainer and the drive plate. The clutch plate may have an aperture for receiving a portion of the spring retainer, and the portion of the spring retainer and the clutch plate may at least partially radially overlap at the aperture. The clutch may be arranged radially outside of the spring retainer.

According to another example embodiment, a sealing arrangement for a hybrid module may include a first seal fixed to an engine block and sealed to an engine crankshaft, and a second seal fixed to the engine block and sealed to the first seal and a housing for the hybrid module. The first seal may include a ring-shaped axial protrusion that contacts the second seal. The second seal may include a metal plate with an integrated ring seal between the metal plate and the housing. The sealing arrangement may include a bolt. The first seal and the second seal may have respective aligned apertures and the bolt may extend through the apertures and into the engine block to fix the first seal and the second seal to the engine block.

According to another example embodiment, a hybrid module may include a housing, a stator ring fixed to the housing, and a plurality of stator laminations. The housing may have a first fluid flow channel and an annular groove connected to the first fluid flow channel. The stator ring may include an aperture axially aligned with the annular groove. The plurality of stator laminations may be arranged in the stator ring. Each of the plurality of stator laminations may have an aperture forming a second fluid flow channel for passing a cooling fluid therethrough. At least one of the plurality of stator laminations may have a radial slot for fluidically connecting the stator ring aperture to the second fluid flow channel.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
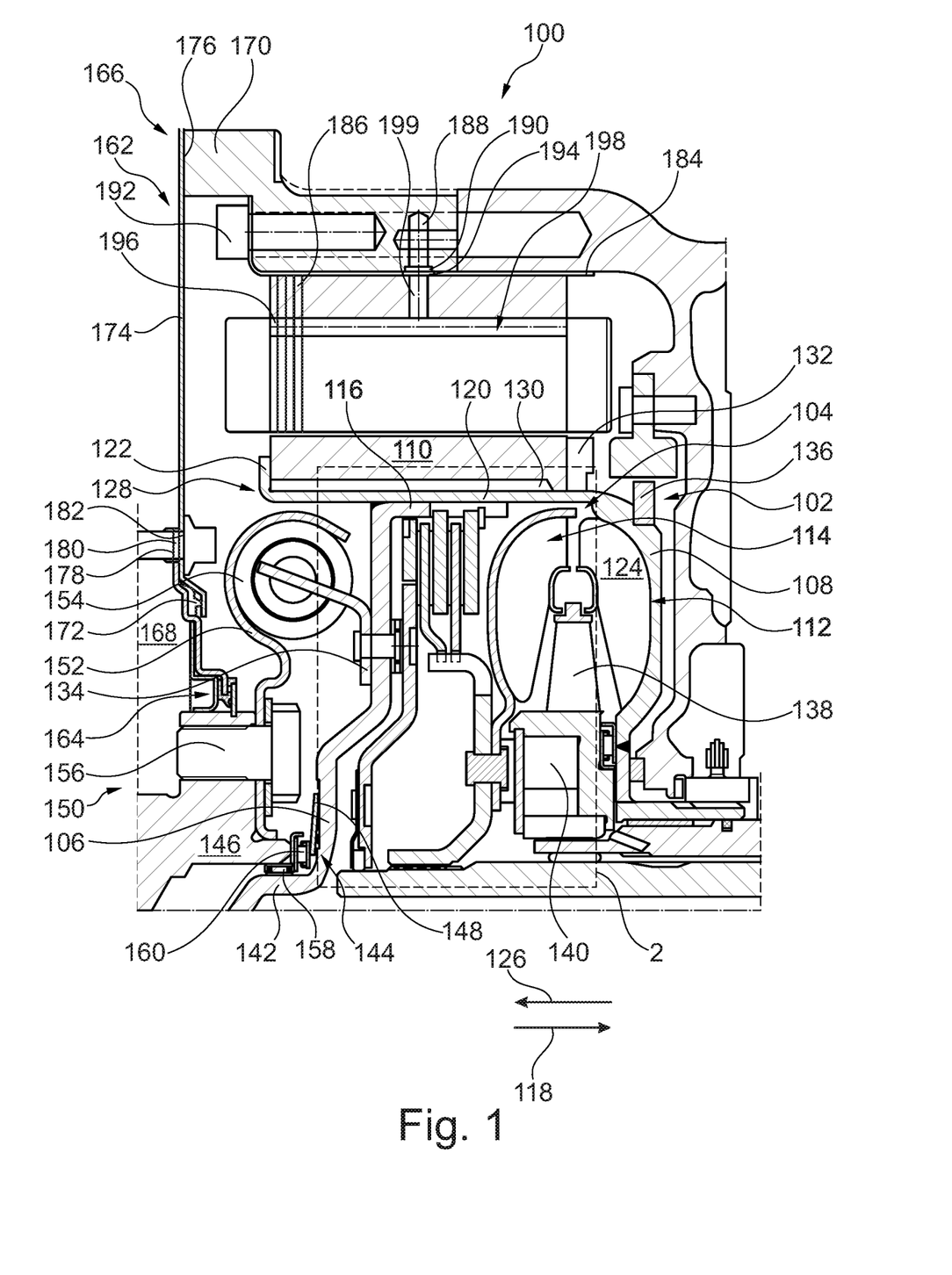
FIG. 1 illustrates a top half cross-sectional view of a hybrid module according to an example aspect of the disclosure.

The following description is made with reference to FIG. 1. FIG. 1 illustrates a top half cross-sectional view of hybrid module 100. Torque converter 102 for hybrid module 100 includes hydraulic coupling arrangement 104, front cover 106, impeller shell 108, and electric rotor 110. Hydraulic coupling arrangement 104 includes impeller 112 and turbine 114. Front cover 106 includes rim 116 extending in axial direction 118. Front cover 106 at least partially encases hydraulic coupling arrangement 104. Impeller shell 108 is fixed to the front cover and at least partially encases hydraulic coupling arrangement 104. Impeller shell 108 includes rim 120, circumferential ring 122, and impeller blade 124. Rim 120 extends in axial direction 126 opposite axial direction 118. Circumferential ring 122 is at distal end 128 of rim 120. Electric rotor 110 is fixed to impeller shell rim 120 and is axially retained by circumferential ring 122.

Rim 120 includes axially extending radial protrusion 130 for circumferentially retaining the electric rotor. That is, the rotor includes a slot that receives protrusion 130 so that the two components are rotationally connected. Though FIG. 1 shows a protrusion, other embodiments are possible. For example, rim 120 may include a slot and the rotor may include a protrusion (not shown). Or, another example embodiment may include slots in rim 120 and rotor 110 with a separate component (i.e., key stock) rotationally connecting the two components. End plate 132 axially retains the rotor. End plate 132 may be fixed to the rim by a shrink fit, staking, or welding, for example. Rim 120 is disposed radially outside of rim 116 and extends axially beyond rim 116 in axial direction 126.

Torque converter 102 includes drive plate 134 fixed to the front cover and arranged for driving engagement with a coil spring. Rim 120 is at least partially disposed radially outside of the drive plate. Torque converter 102 includes resolver rotor 136 fixed to the impeller shell. Resolver rotor is at least partially axially aligned with impeller blade 124. By axially aligned, we mean that a same radial line can be drawn through the resolver rotor and the impeller blade. In other words, the two components are aligned in an axial direction. The resolver rotor is radially outside of the impeller blade. Torque converter 102 includes hydraulic stator 138 and one-way clutch 140.

Torque converter 102 includes cover hub 142 and bearing 144. Bearing 144 is arranged on the cover hub for installation between the cover hub and engine crankshaft 146. Torque converter 102 includes resilient element 148 (e.g., a diaphragm spring) disposed axially between the front cover and the bearing. Element 148 allows axial displacement of the crankshaft without necessarily displacing torque converter 102.

Torque converter drive arrangement 150 includes front cover 106, drive plate 134, spring retainer 152, and coil spring 154. Spring retainer arranged for fixing directly to engine crankshaft 146 by bolts 156, for example. The coil spring is in driving engagement with the drive plate and the spring retainer to transfer torque from the crankshaft to the front cover. Hub 142 is integral to front cover 106 and formed from a same piece of material. Although hub 142 and cover 106 are shown integrally formed, other embodiments are possible. For example, hub 142 may be a separate component fixed to front cover 106 as described below. In the example embodiment shown in FIG. 1, bearing 144 is a combined radial and axial bearing. That is, the bearing includes radial rolling elements 158 and axial rolling elements 160 to rotationally isolate the crankshaft and hub from both radial loads and axial thrust loads. Although bearing 144 is shown as a combined radial and axial bearing, other embodiments are possible. For example, bearing 144 may be only a radial or axial bearing as described below. Bearing 144 is installed on cover hub 142 and arranged to interface with engine crankshaft 146.

Sealing arrangement 162 includes seal 164 and seal 166. Seal 164 is fixed to engine block 168 and sealed to engine crankshaft 146. Seal 166 is fixed to the engine block and sealed to seal 164 and housing 170. Seal 164 includes ring-shaped axial protrusion 172 that contacts seal 166. Seal 166 includes metal plate 174 with integrated ring seal 176 between the metal plate and the housing. Sealing arrangement 162 includes bolt 178. Seal 164 and seal 166 include respective aligned apertures 180 and 182. Bolt 178 extends through the apertures and into the engine block to fix seals 164 and 166 to the engine block.

Hybrid module 100 includes housing 170, stator ring 184, and a plurality of stator laminations 186. Housing 170 includes fluid flow channel 188 and annular groove 190 connected to flow channel 188. Stator ring 184 is fixed to the housing (e.g., by bolts 192) and includes aperture 194 axially aligned with the annular groove. Laminations 186 are arranged in stator ring 184. Each of the plurality of stator laminations includes aperture 196 forming a portion of fluid flow channel 198 for passing a cooling fluid therethrough. At least one of the plurality of stator laminations includes radial slot 199 for fluidically connecting the stator ring aperture to the fluid flow channel 198.

Figure 2:
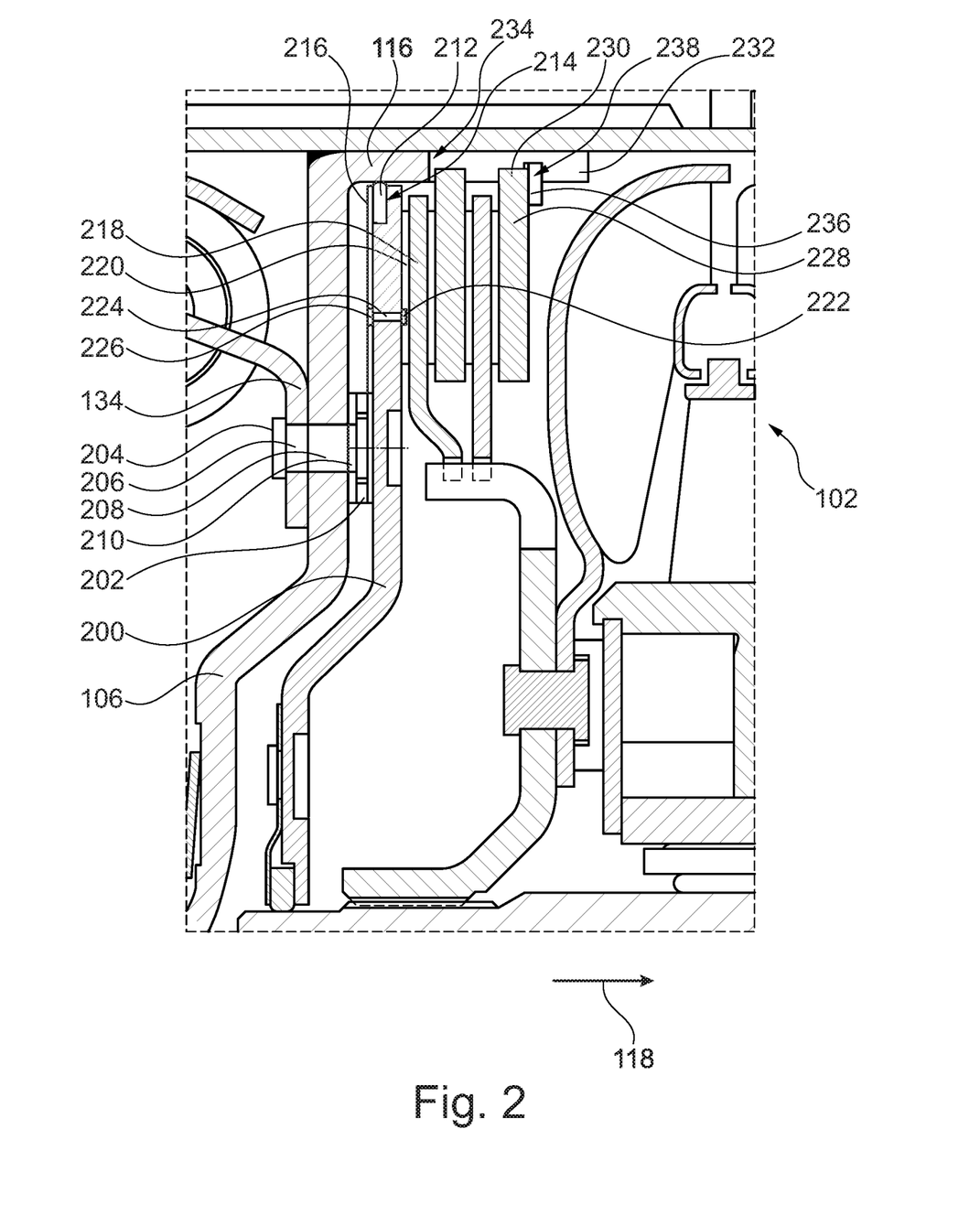
FIG. 2 illustrates a detail view of boxed region 2 in FIG. 1.

The following description is made with reference to FIG. 2. FIG. 2 illustrates a detail view of boxed region 2 in FIG. 1. Torque converter 102 includes piston plate 200, leaf spring 202, and rivet 204. Piston plate 200 is axially displaceable and rotationally fixed to front cover 106. Leaf spring 202 connects the piston plate to the front cover. Rivet 204 extends through aperture 206 in the drive plate, aperture 208 in the front cover, and aperture 210 in the leaf spring to fix the drive plate, the front cover, and the leaf spring together. Seal 212 is disposed in radially outer notch 214 of the piston plate. The leaf spring includes a plurality of leaf springs (not shown) integrally formed as a single component with radially outer ring 216 for axially retaining the seal in the notch.

Torque converter 102 includes friction plate 218 with friction material ring 220 having groove 222. Piston plate 200 and leaf spring 202 include respective aligned apertures 224 and 226, radially aligned with the groove. Torque converter 102 includes clutch plate 228 with radial tab 230. Front cover 106 includes tab 232 extending axially in direction 118 from distal end 234 of rim 116 and in driving engagement with radial tab 230. Torque converter 102 includes snap ring 236. Tab 232 includes groove 238 and snap ring 236 is disposed in the groove to axially retain the clutch plate.

Figure 3:
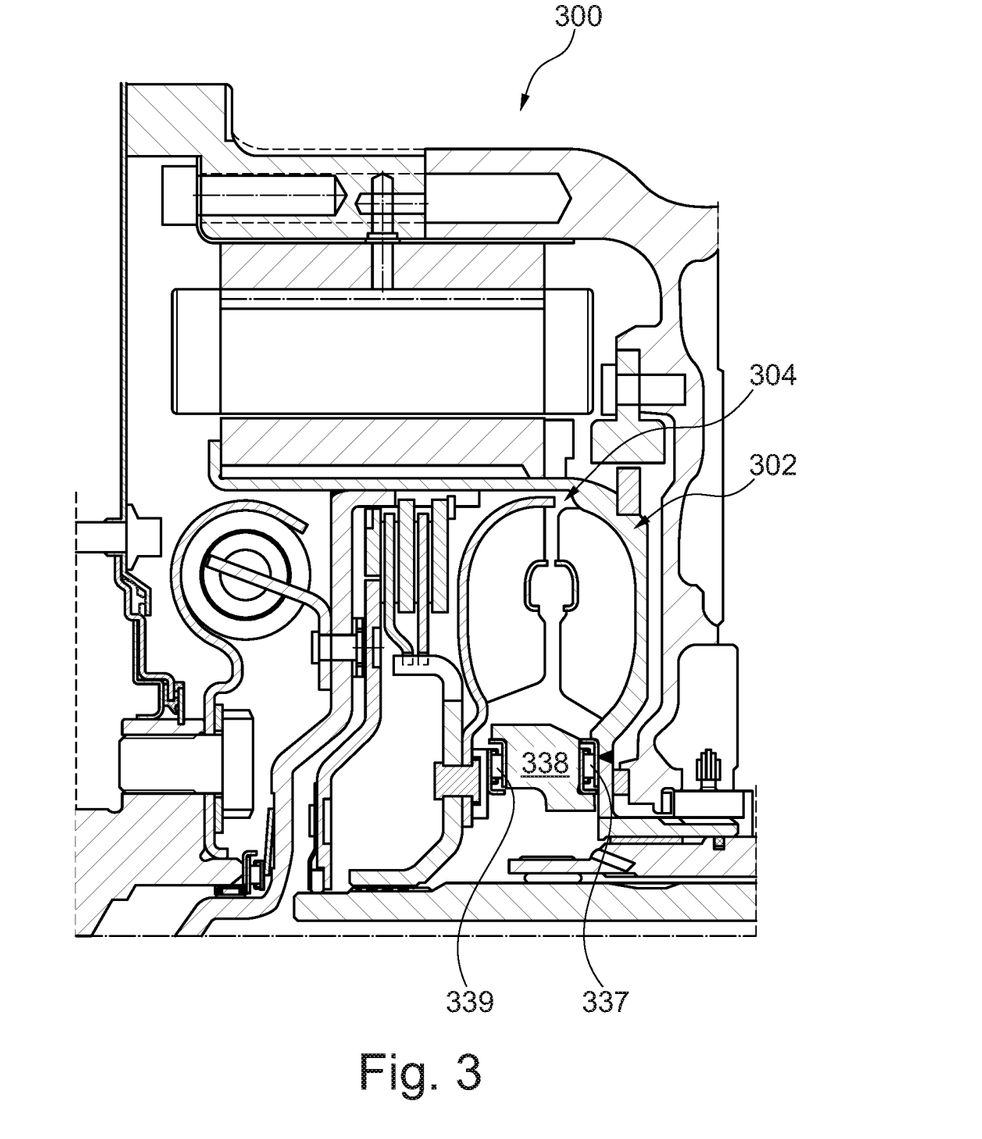
FIG. 3 illustrates a top half cross-sectional view of a hybrid module according to an example aspect of the disclosure.

The following description is made with reference to FIG. 3. FIG. 3 illustrates a top half cross-sectional view of hybrid module 300. Module 300 is generally the same as module 100 described above, except as described below. Torque converter 302 includes hydraulic coupling arrangement 304. Hydraulic coupling arrangement 304 is a fluid coupling devoid of a stator. That is, hydraulic stator 138 in torque converter 102 is replaced with spacer block 338 in torque converter 302. Bearings 337 and 339 on either side of block 338 allow relative rotation of block 338, impeller 112 and turbine 114.

Figure 4:
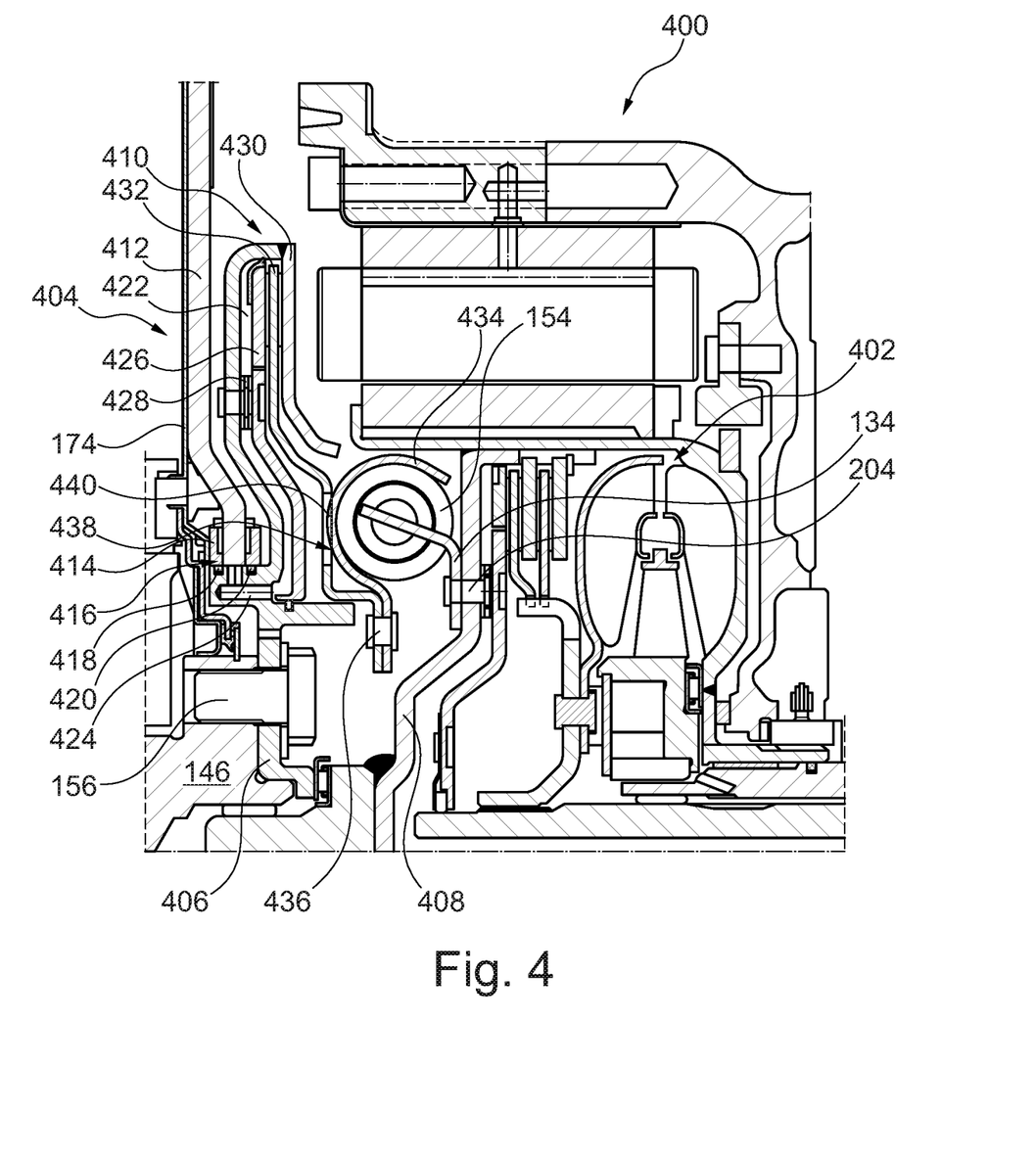
FIG. 4 illustrates a top half cross-sectional view of a hybrid module according to an example aspect of the disclosure.

The following description is made with reference to FIG. 4. FIG. 4 illustrates a top half cross-sectional view of hybrid module 400. Module 400 is generally the same as module 100 described above, except as described below. Module 400 includes torque converter 402 and clutched drive arrangement 404 for torque converter 402. Clutched drive arrangement 404 includes hub 406, front cover 408, clutch 410 and radial pipe 412. Hub 406 is arranged for fixing directly to engine crankshaft 146 by bolts 156, for example. Clutch 410 is arranged for releasably connecting the hub to the front cover. Radial pipe 412 is sealingly engaged with the hub to provide an operating oil to the clutch for rotationally connecting the engine and the front cover.

Radial pipe 412 is installed in ring 414 arranged for fixing to an engine block (e.g. by weld 416 and metal plate 174). Hub 406 includes circumferential seals 418 and 420 for sealing the hub to the ring. Clutch 410 includes apply chamber 422. Hub 406 includes flow path 424 fluidically connecting radial pipe 412 and apply chamber 422. Clutched drive arrangement 404 includes clutch piston plate 426 and leaf spring 428. Apply chamber 422 is at least partially formed by the hub and the clutch piston plate. The leaf spring rotationally fixes the clutch piston plate to the hub. Clutched drive arrangement 404 includes backing plate 430 and clutch plate 432. The backing plate is fixed to the hub. Clutch piston plate 426 is installed between the hub and the clutch plate. The clutch plate is installed between the clutch piston plate and the backing plate.

Clutched drive arrangement 404 includes spring retainer 434, drive plate 134, and spring 154. The spring retainer is fixed to clutch plate 432 by rivet 436. The drive plate is fixed to front cover 408 by rivet 204. The spring is drivingly engaged with the spring retainer and the drive plate. Clutch plate 432 includes aperture 438 for receiving portion 440 of the spring retainer. Portion 440 and the clutch plate at least partially axially overlap at the aperture. Clutch 410 is arranged radially outside of the spring retainer.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMERALS

100 Hybrid module
102 Torque converter

104 Hydraulic coupling arrangement
106 Front cover
108 Impeller shell
110 Electric rotor
112 Impeller
114 Turbine
116 Rim (front cover)
118 Axial direction
120 Rim (impeller)
122 Circumferential ring
124 Impeller blade
126 Axial direction
128 Distal end
130 Radial protrusion
132 End plate
134 Drive plate
136 Resolver rotor
138 Hydraulic stator
140 One-way clutch
142 Cover hub
144 Bearing
146 Engine crankshaft
148 Resilient element
150 Torque converter drive arrangement
152 Spring retainer
154 Coil spring
156 Bolts (crankshaft)
158 Radial rolling elements
160 Axial rolling elements
162 Sealing arrangement
164 Seal (crankshaft)
166 Seal (housing)
168 Engine block
170 Housing
172 Ring-shaped axial protrusion
174 Metal plate
176 Integrated ring seal
178 Bolt (engine block)
180 Aperture (seal 164)
182 Aperture (seal 166)
184 Stator ring
186 Stator lamination
188 Fluid flow channel (housing)
190 Annular groove
192 Bolts (housing)
194 Aperture (stator ring)
196 Aperture (lamination)
198 Fluid flow channel (lamination)
199 Radial slot
200 Piston plate
202 Leaf spring
204 Rivet
206 Aperture (drive plate)
208 Aperture (front cover)
210 Aperture (leaf spring)
212 Seal
214 Notch
216 Radially outer ring
218 Friction plate
220 Friction material ring
224 Aperture (piston plate)
226 Aperture (leaf spring)
228 Clutch plate
230 Radial tab (clutch plate)
232 Tab (front cover)
234 Distal end
236 Snap ring
238 Groove
300 Hybrid module
302 Torque converter
304 Hydraulic coupling arrangement
337 Bearing (impeller side)
338 Spacer block
339 Bearing (turbine side)
400 Hybrid module
402 Torque converter
404 Clutched drive arrangement
406 Hub
408 Front cover
410 Clutch
412 Radial pipe
414 Ring
416 Weld
418 Circumferential seal
420 Circumferential seal
422 Apply chamber
424 Flow path
426 Clutch piston plate
428 Leaf spring
430 Backing plate
432 Clutch plate
434 Spring retainer
436 Rivet
438 Aperture (clutch plate)
440 Spring retainer portion

What is claimed is:

1. A torque converter for a hybrid module, comprising:
a hydraulic coupling arrangement comprising an impeller and a turbine;
a front cover comprising a first rim extending in a first axial direction, the front cover at least partially encasing the hydraulic coupling arrangement;
an impeller shell, fixed to the front cover and at least partially encasing the hydraulic coupling arrangement, the impeller shell comprising:
a second rim extending in a second axial direction, opposite the first axial direction;
a circumferential ring at a distal end of the second rim; and,
at least one impeller blade; and,
an electric rotor fixed to the second rim and axially retained by the circumferential ring.

2. The torque converter of claim 1 wherein the second rim comprises an axially extending radial protrusion for circumferentially retaining the electric rotor.

3. The torque converter of claim 1 wherein the second rim is disposed radially outside of the first rim and extends axially beyond the first rim in the second axial direction.

4. The torque converter of claim 1 further comprising a drive plate fixed to the front cover and arranged for driving engagement with a coil spring, wherein the second rim is at least partially disposed radially outside of the drive plate.

5. The torque converter of claim 1 further comprising:
a drive plate fixed to the front cover and arranged for driving engagement with a coil spring;
a piston plate, axially displaceable and rotationally fixed to the front cover;
a leaf spring connecting the piston plate to the front cover; and,
a rivet, extending through respective apertures in the drive plate, the front cover, and the leaf spring to fix the drive plate, the front cover, and the leaf spring together.

6. The torque converter of claim 1 further comprising:
a piston plate, axially displaceable and rotationally fixed to the front cover;
a leaf spring connecting the piston plate to the front cover; and,
a seal disposed in a radially outer notch of the piston plate, wherein the leaf spring comprises a plurality of leaf springs integrally formed as a single component with a radially outer ring for axially retaining the seal in the radially outer notch.

7. The torque converter of claim 6 further comprising a friction plate including a friction material ring with a groove, wherein the piston plate and the leaf spring comprise respective aligned apertures radially aligned with the groove.

8. The torque converter of claim 1 further comprising a clutch plate with a radial tab, wherein the front cover comprises a tab extending axially in the first axial direction from a distal end of the first rim and in driving engagement with the radial tab.

9. The torque converter of claim 8 further comprising a snap ring, wherein the tab comprises a groove and the snap ring is disposed in the groove to axially retain the clutch plate.

10. The torque converter of claim 1 further comprising a resolver rotor fixed to the impeller shell.

11. The torque converter of claim 10 wherein the resolver rotor is at least partially axially aligned with the impeller blade.

12. The torque converter of claim 1 wherein:
the hydraulic coupling arrangement further comprises a hydraulic stator and a one-way clutch; or,
the hydraulic coupling arrangement is a fluid coupling devoid of a stator.

13. The torque converter of claim 1 further comprising:
a cover hub;
a bearing arranged on the cover hub for installation between the cover hub and an engine crankshaft; and,
a resilient element disposed axially between the front cover and the bearing.

14. A torque converter drive arrangement comprising:
the torque converter of claim 1;
a drive plate fixed to the front cover;
a spring retainer arranged for fixing directly to an engine crankshaft;
a coil spring in driving engagement with the drive plate and the spring retainer; and,
a combined radial and axial bearing, wherein the front cover comprises an integral cover hub formed from a same piece of material and the combined radial and axial bearing is installed on the integral cover hub and arranged to interface with the engine crankshaft.

15. A clutched drive arrangement for a torque converter comprising:
the torque converter of claim 1;
a hub arranged for fixing directly to an engine crankshaft;
a clutch arranged for releasably connecting the hub to the front cover; and,
a radial pipe sealingly engaged with the hub to provide an operating oil to the clutch for rotationally connecting the engine crankshaft and the front cover.

16. The clutched drive arrangement of claim 15 wherein:
the radial pipe is installed in a ring arranged for fixing to an engine block;
the hub comprises a pair of circumferential seals for sealing the hub to the ring; and,
the clutch comprises an apply chamber; and,
the hub comprises a flow path fluidically connecting the radial pipe and the apply chamber.

17. The clutched drive arrangement of claim 15 further comprising:
a clutch plate installed between a clutch piston plate and a backing plate;
a spring retainer fixed to the clutch plate;
a drive plate fixed to the front cover; and,
a spring drivingly engaged with the spring retainer and the drive plate.

18. The clutched drive arrangement of claim 17 wherein:
the clutch plate comprises an aperture for receiving a portion of the spring retainer; and,
the portion of the spring retainer and the clutch plate at least partially radially overlap at the aperture.

19. A hybrid module comprising:
the torque converter of claim 1;
a housing comprising a first fluid flow channel and an annular groove connected to the first fluid flow channel;
a stator ring fixed to the housing and including a stator ring aperture axially aligned with the annular groove; and,
a plurality of stator laminations arranged in the stator ring, each of the plurality of stator laminations comprising an aperture forming a second fluid flow channel for passing a cooling fluid therethrough wherein:
at least one of the plurality of stator laminations comprises a radial slot for fluidically connecting the stator ring aperture to the second fluid flow channel.

* * * * *